(12) United States Patent
Lipper, III

(10) Patent No.: US 7,487,122 B2
(45) Date of Patent: Feb. 3, 2009

(54) DYNAMIC SECURITY PRICE AND VALUE COMPARATOR AND INDEXER

(76) Inventor: Arthur Lipper, III, 14911 Caminito Ladera, Del Mar, CA (US) 92014-3929

( * ) Notice: Subject to any disclaimer, the term of this patent is extended or adjusted under 35 U.S.C. 154(b) by 1621 days.

(21) Appl. No.: 10/010,946

(22) Filed: Dec. 6, 2001

(65) Prior Publication Data

US 2002/0123952 A1    Sep. 5, 2002

Related U.S. Application Data

(60) Provisional application No. 60/251,656, filed on Dec. 6, 2000.

(51) Int. Cl.
*G06Q 40/00*    (2006.01)
(52) U.S. Cl. ............................................. 705/36
(58) Field of Classification Search .................... 705/36
See application file for complete search history.

(56) References Cited

U.S. PATENT DOCUMENTS

| | | | | |
|---|---|---|---|---|
| 5,761,442 A | * | 6/1998 | Barr et al. ................. | 705/36 R |
| 5,819,238 A | * | 10/1998 | Fernholz .................... | 705/36 R |
| 5,946,666 A | * | 8/1999 | Nevo et al. ................ | 705/36 R |
| 6,003,018 A | * | 12/1999 | Michaud et al. ........... | 705/36 R |
| 6,035,286 A | * | 3/2000 | Fried ........................ | 705/36 R |
| 6,061,663 A | * | 5/2000 | Bloom et al. .............. | 705/36 R |
| 6,064,985 A | * | 5/2000 | Anderson ................. | 705/36 R |
| 6,510,419 B1 | * | 1/2003 | Gatto ........................ | 705/36 R |
| 6,564,191 B1 | * | 5/2003 | Reddy ...................... | 705/36 R |
| 6,799,167 B1 | * | 9/2004 | Gullen et al. ............. | 705/36 R |
| 6,983,257 B2 | * | 1/2006 | Gatto ........................ | 705/36 R |

OTHER PUBLICATIONS

"BondEdge Version 4.1 Released with New Global Functionality," Mar. 28, 2000, PR Newswire, p. 1.*

* cited by examiner

*Primary Examiner*—Hani M. Kazimi
*Assistant Examiner*—Michael R Zecher
(74) *Attorney, Agent, or Firm*—Ober/Kaler; Royal W. Craig

(57) ABSTRACT

A system and method for dynamic security price and value comparison in indexed terms of a large number of user selected factors relating to a large number of user selected securities, all with regard to a single "pivot" security. The method is implemented as a Java script computer program that permits a user to view security data on an indexed basis whereby a pivot company is chosen and represented as 100 for each of the factors. Any of a large number of companies listed can be selected by the user as the pivot security. The benefit of using the Comparator & Indexer is that relative valuations to those of the pivot security become immediately apparent either resulting in a value conclusion or determination as to the areas necessary for further focused study.

9 Claims, 14 Drawing Sheets

| | Return on Assets | Return on Equity | Current Ratio (mrq) | Debt/Equity (mrq) | Shares Short | Short Ratio |
|---|---|---|---|---|---|---|
| AMGEN (AMGN) | $26.04 | $35.12 | 2.95 | 0 | 0 | 0 |
| Pharmacia (PHA) | $6.7 | $12.64 | 1.45 | 0 | 0 | 0 |

Absolute Values | Relative Values

Dynamic Price and Share Value Comparator and

Please pick your choice of stocks

AMGN, PHA

Pick A Stock Below and Click ADD

ASTM: Aastrom Biosciences
ABGX: Abgenix Inc
ACLA: Aclara Biosciences Inc
AVM: Advanced Magnetics
AGTO: Agritope Inc Del
ALXN: Alexion Pharm Inc
ALGO: Algos Pharm Corp
ALKS: Alkermes Inc.
ALLP: Alliance Pharm.
ALTH: Allos Therapeutics Inc add Save Choices

Fig. 1

| Absolute Values | Relative Values |

Dynamic Price and Share Value Comparator and

| | Latest Price | % change in price vs 30 days | % change in price vs 90 days | % change in price vs 180 days |
|---|---|---|---|---|
| AMGEN (AMGN) | $60.25 | 0 | 0 | 0 |
| Pharmacia (PHA) | $55.125 | 0 | 0 | 0 |

Fig. 2a

| Absolute Values | Relative Values |

Dynamic Price and Share Value Comparator and

| | % change in price vs 365 days | % change in price from 52 week high | % change in price from 52 week low |
|---|---|---|---|
| AMGEN (AMGN) | o | o | o |
| Pharmacia (PHA) | o | o | o |

Fig. 26

| Absolute Values | Relative Values | | | | |
|---|---|---|---|---|---|
| Dynamic Price and Share Value Comparator and | | | | | |
| | Average Daily Volume 90 days | Market Capitalization (mrq) | Shares Outstanding (mrq) | Annual Dividend (ttm) |
| AMGEN (AMGN) | 0 | $55188.8 | 1073741824 | $0 |
| Pharmacia (PHA) | 0 | $63953 | 1610612736 | $0.48 |

Fig. 2c

[Absolute Values] [Relative Values]

Dynamic Price and Share Value Comparator and

| | Dividend Yield (ttm) | Earnings Yield (ttm) | Per Share Book Value (ttm) | EPS (earnings per share) | Sales |
|---|---|---|---|---|---|
| AMGEN (AMGN) | $0 | $1.88 | $2.97 | $1.01 | $3408.7 |
| Pharmacia (PHA) | $0.94 | $3.04 | $10.46 | $1.55 | $9772 |

Fig. 2d

| Absolute Values | Relative Values |

Dynamic Price and Share Value Comparator and

| | EBITDA (earnings before income and taxes) | Price/Book Value (mrq) | Price/Earnings (ttm) | Price/Sales (ttm) |
|---|---|---|---|---|
| AMGEN (AMGN) | $0 | $12.42 | 53.2 | 16.9 |
| Pharmacia (PHA) | $0 | $4.37 | 32.9 | 2.7 |

Fig. 2e

| Absolute Values | Relative Values |

Dynamic Price and Share Value Comparator and

| | Return on Assets | Return on Equity | Current Ratio (mrq) | Debt/Equity (mrq) | Shares Short | Short Ratio |
|---|---|---|---|---|---|---|
| AMGEN (AMGN) | $26.04 | $35.12 | 2.95 | 0 | 0 | 0 |
| Pharmacia (PHA) | $6.7 | $12.64 | 1.45 | 0 | 0 | 0 |

Fig. 2f

Dynamic Price and Share Value Comparator and

[ Absolute Values ] [ Relative Values ]

| | Latest Price | % change in price vs 30 days | % change in price vs 90 days | % change in price vs 180 days |
|---|---|---|---|---|
| AMGEN (AMGN) | 1.0 | 0.0 | 0.0 | 0.0 |
| Pharmacia (PHA) | 0.9 | 0.0 | 0.0 | 0.0 |

Fig. 39

| Absolute Values | Relative Values |

Dynamic Price and Share Value Comparator and

| | % change in price vs 365 days | % change in price from 52 week high | % change in price from 52 week low |
|---|---|---|---|
| AMGEN (AMGN) | 0.0 | 0.0 | 0.0 |
| Pharmacia (PHA) | 0.0 | 0.0 | 0.0 |

Fig. 36

| | Dynamic Price and Share Value Comparator and | | | | |
|---|---|---|---|---|---|
| Absolute Values | Relative Values | | | | |
| | Average Daily Volume 90 days | Market Capitalization (mrq) | Shares Outstanding (mrq) | Annual Dividend (ttm) |
| AMGEN (AMGN) | 0.0 | 1.0 | 1.1 | 0.0 |
| Pharmacia (PHA) | 0.0 | 1.1 | -1.5 | 8 |

Fig. 3c

Dynamic Price and Share Value Comparator and Relative Values

| | Dividend Yield (ttm) | Earnings Yield (ttm) | Per Share Book Value (ttm) | EPS (earnings per share) | Sales |
|---|---|---|---|---|---|
| AMGEN (AMGN) | 0.0 | 1.0 | 1.0 | 1.0 | 1.0 |
| Pharmacia (PHA) | ∞ | 1.6 | 3.5 | 1.5 | 2.8 |

Fig. 3d

| Absolute Values | Relative Values |

Dynamic Price and Share Value Comparator and

| | EBITDA (earnings before income and taxes) | Price/Book Value (mrq) | Price/Earnings (ttm) | Price/Sales (ttm) |
|---|---|---|---|---|
| AMGEN (AMGN) | 0.6 | 1.0 | 1.0 | 1.0 |
| Pharmacia (PHA) | 0.0 | 0.3 | 0.6 | 0.1 |

Fig. 3e

Absolute Values | Relative Values

Dynamic Price and Share Value Comparator and

| | Return on Assets | Return on Equity | Current Ratio (mrq) | Debt/Equity (mrq) | Shares Short | Short Short Ratio |
|---|---|---|---|---|---|---|
| AMGEN (AMGN) | 1.0 | 1.0 | 1.0 | 0.0 | 0.0 | 0.0 |
| Pharmacia (PHA) | 0.2 | 0.3 | 0.7 | 0.0 | 0.0 | 0.0 |

DYNAMIC SECURITY PRICE AND VALUE COMPARATOR AND INDEXER

CROSS-REFERENCE TO RELATED APPLICATIONS

The present application derives priority from U.S. provisional application No. 60/251,656 for "DYNAMIC SECURITY PRICE AND VALUE COMPARATOR AND INDEXER"; Filed: Dec. 6, 2000.

BACKGROUND OF THE INVENTION

1. Field of the Invention

The present invention relates to information management and, more particularly, to a robust, web-enabled fully automated dynamic security price and share value comparator and indexer.

2. Description of the Background

The art of successful investing is based upon an ability to intelligently compare the values inherent in alternative investment opportunities. This comparison reflects the need for using the principle of opportunity cost. Opportunity cost is defined as the advantage forgone as the result of the acceptance of an alternative. It is measured both in prospect as well as retrospectively as the benefits that would result from the next best alternative investment that were rejected in favor of the one accepted. Opportunity cost is difficult, perhaps impossible, to measure precisely, and the concept is not used by investors in conducting any formalized investment analysis.

Traditional spread sheet analysis of security data is well known. There are a multitude of existing analysis techniques ranging from simple price earnings ratios to more complicated tracking models.

For example, U.S. Pat. No. 6,064,985 to Anderson shows an automated portfolio management system and method which manages data in a database, and populates the database with data from a data feed off the Internet. The system utilizes double leveraging of funds and purchased index puts as insurance against market downturns, to generate a guaranteed high yield. The double leveraging is accomplished by selling covered calls and using a formula to determine the maximum amount to borrow against the portfolio, and using income from both sources to purchase additional stock. The high yield from the portfolio is protected from market downturns by index puts.

U.S. Pat. No. 6,035,286 to Fried shows a computer implemented method for screening a database of stock information based upon buyback ratio and prices/sales ratio selection criteria. The buyback ratio represents the percentage of stocks repurchased by a company during a given period that resulted in a net decrease in outstanding shares. The method and system use the criteria to identify companies with a highest buyback ratio and with the lowest price/sale ratio. The resulting list of stocks are ranked and output in an investment report.

U.S. Pat. No. 6,003,018 to Michaud et al. discloses a method for evaluating a portfolio. Using the "Markowitz paradigm", a portfolio may be optimized, with the goal of deriving the peak average return for a given level of risk and any specified set of constraints, in order to derive a so-called "mean-variance (MV) efficient" portfolio using known techniques of linear or quadratic programming as appropriate. A mean-variance efficient portfolio is computed for a plurality of simulations of input data statistically consistent with an expected return and expected standard deviation of return, and each such portfolio is associated, by means of an index, with a specified portfolio on the mean variance efficient frontier. A statistical mean of the index-associated mean-variance efficient portfolios is used for evaluating a portfolio for consistency with a specified risk objective.

U.S. Pat. No. 5,761,442 to Barr et al. shows a method for selecting securities based on a set of artificial neural networks which are designed to model and track the performance of each security in a given capital market and output a parameter which is related to the expected risk adjusted return for the security. Each artificial neural network is trained using a number of fundamental and price and volume history input parameters about the security and the underlying index. The system combines the expected return/appreciation potential data for each security via an optimization process to construct an investment portfolio which satisfies predetermined aggregate statistics. The data processing system receives input from the capital market and periodically evaluates the performance of the investment portfolio, rebalancing it whenever necessary to correct performance degradations.

Some of the foregoing tools and techniques have been made available on the internet, and at least a few incorporate executable Java scripts for accomplishing and graphing stock data. One known reference employs indexing. U.S. Pat. No. 6,061,663 to Bloom et al. (NASDAQ) shows a computer program product for rebalancing a capitalization weighted stock index in order to prevent the capitalization weight of a few high capitalized stocks from dominating the overall performance of the index. Index rebalancing is accomplished while maintaining the original relative position of stocks and reducing the market impact of rebalancing on the Small Individual Stock group.

While the foregoing reflects an adjustment to a stock index to account for large-capitalization companies, neither this nor any other existing technical analysis methods measure opportunity cost as reflected by the use of a pivot stock (as opposed to the calculation of pivot points). For instance, Bolverk's Lair by Arthur Corliss is a website that contains a Stock Pivot Tool that calculates pivot points using the traditional method, and produces historical graphs of both pivot points (with moving averages) and candlesticks. Price crossing the pivot on an up move is a bullish event; a cross below the pivot on a down move is a bearish event. Once a bullish indication has registered the study offers two resistance levels for the price to test. If the first resistance is penetrated price can be expected to test the second resistance. Professional investment decision making should be the result of a study of relative values as the absolute statistics only have relevance when related to alternatives. It would be greatly advantageous to facilitate the comparison in indexed terms, of a large number of user selected factors relating to a large number of user selected securities, all with regard to a single user-selectable "pivot" security. This would result in a better quality of decision making because the indexing would be based on the user's personal opportunity costs rather than a canned index (such as the Dow Jones). If used correctly, this approach could vastly improve the personal investment management performance of the user.

SUMMARY OF THE INVENTION

In accordance with the above, it is an object of the present invention to provide a web-enabled security comparison system capable of facilitating the comparison in indexed terms of a large number of user selected factors relating to a large number of user-selected securities, all with regard to a single user-selectable "pivot" security.

It is another object to introduce the concept of opportunity cost to investment management, thereby resulting in better quality decision making, in less time, with the result of improved investment management performance.

In accordance with the above-described object, the present invention provides robust, web-enabled fully automated system and method for dynamic security price and value comparison and indexing. The system is capable of facilitating the comparison in indexed terms of a large number of user selected factors relating to a large number of user selected securities, all with regard to a single user-selected "pivot" security. In particular, the comparator & indexer of the present invention is a Java script computer program that permits a user to compare, in absolute or indexed terms, a large number of user selected factors relating to a large number of user selected securities. The data can be viewed on an indexed basis whereby a pivot company is chosen and represented as 100 for each of the factors. Any of a large number of companies listed can be selected by the user as the pivot security. Absolute values can also be shown. The benefit of using the Comparator & Indexer is that relative valuations to those of the pivot security become immediately apparent. As with any index, this index approach results in a faster (easy manual or programmed automatic) value judgment as to where to devote further focused study. However, this particular index approach does it by allowing the user to incorporate personal opportunity cost into the value judgment, and when used correctly, this vastly improves the personal investment management performance of the user.

BRIEF DESCRIPTION OF THE DRAWINGS

Other objects, features, and advantages of the present invention will become more apparent from the following detailed description of the preferred embodiment and certain modifications thereof when taken together with the accompanying drawings in which:

FIG. 1 is a screen print of the security selection screen listing trading symbol and corporate name of all securities that are monitored by the central server.

FIG. 2 is a series of screen prints of the spreadsheet table of security data generated by the dynamic price and share value comparator and indexer applet of the present invention, showing the subject Absolute data arranged in rows of user-selectable securities and columns of user-selectable security numbers.

FIG. 3 is a series of screen prints of the spreadsheet table of security data generated by the dynamic price and share value comparator and indexer applet of the present invention, showing the subject Relative (indexed) data arranged in rows of user-selectable securities and columns of user-selectable security numbers.

FIG. 4 is a screen print of the dynamic price and share value comparator and indexer applet of the present invention, showing the menu by which the user can select an array of values to be considered in each of the screens shown in FIGS. 2-3.

DETAILED DESCRIPTION OF THE PREFERRED EMBODIMENT

The present invention is a Comparator & Indexer method and computer program that permits a user to compare, in absolute or indexed terms, a large number of user selected factors relating to a large number of user selected securities. The key advantage of the Comparator & Indexer is that it allows the user to intelligently compare the values inherent in alternative investment opportunities based on personalized opportunity costs. The underlying premise for the Comparator & Indexer is that investment decision making should be the result of a study of relative values as absolute statistics only have relevance when related to alternatives. Consequently, proper use of the Comparator & Indexer results in a better quality of decision making, in less time, and therefore improves the investment management performance of the user.

The system architecture of the present invention includes a central web server on which a database of current company financial data is maintained. The web server is selectively accessible to subscribers as will be described, and supporting software is maintained in it. The supporting software includes a spreadsheet for maintaining current and historical company figures, and a security monitoring module that imports real time security and corporate data into the spreadsheet. The spreadsheet application may be any of a variety of conventional spreadsheet applications such as Microsoft Excel®. The security monitoring module automatically updates the spreadsheet data periodically from security index data. Historical data for many securities is available for downloading from a wide number of online service companies. Moreover, it is possible using conventional spreadsheet applications such as Microsoft Excel to run web queries in order to accumulate and import the external data to a spreadsheet. The imported data can be updated on a regular basis from the same worksheet and used for calculations or in analyses in accordance with the present method. Thus, the security monitoring module is preferably a simple web query and further information on running web queries is readily available. See, e.g., Sarasota PC Monitor, August 1999. Preferably, the data is updated at least daily. The supporting software maintained on the server also includes the Comparator & Indexer computer program according to the present invention.

Given the central web server and database of current company figures maintained thereon, the remaining system architecture of the present invention includes the numerous users with their remote personal computers who can contact and communicate with the central server over the internet given the server's TCP/IP address.

Once a user initiates a connection to the server, the Comparator & Indexer computer program and method incorporated therein begins with user authentication. For example, the user enters their registered user name and password to gain access to the program. Given proper authentication, the Comparator & Indexer computer program executes a series of Java applets to facilitate the purpose of the present invention.

The first Java applet assembles the security selection screen of FIG. 1. The security selection screen of FIG. 1 includes a scrollable window at right that lists the trading symbol and corporate name of all securities that are monitored by the central server (via the above-described security monitoring module that imports real time security and corporate data to the server). From this list, a user can select a particular security or subset of securities for analysis. This is readily accomplished by selecting each desired security shown in the scrollable window and clicking the "ADD" button directly beneath. The selected security will be added to the scrollable Target Security window shown to the left. All of the user's selections can be permanently stored by clicking the SAVE CHOICES button below. While the exemplary securities shown are all stocks, it should be understood that the system works just as well with debt instruments, options, and commodities futures. Therefore, the use of the term "security" is not intended to be limited to stocks, but should be inferred to include all types of securities.

Once the SAVE CHOICES button is exercised, the program executes a second Java applet that dynamically processes the imported data and renders the spreadsheet table shown in FIGS. 2a-f. The spreadsheet table is navigated lengthwise from FIGS. 2a to 2f by a scroll bar at bottom. Since the application is presented on a web page with a java applet, the company figures are taken dynamically from the server spreadsheet and are always up to date (no need to download an update a database). Moreover, the application itself is up to date and there is never a need to download the latest version. New features can be added and automatically passed to all subscribers the next time they "run" the program.

Generally, the spreadsheet table shown in FIGS. 2a-f is a spreadsheet-like table of security data, arranged in rows of user-selectable securities and columns of user-selectable security factors. The table is designed to present the security factors either as absolute values, or as ratios, referred to as index numbers, relative to a single selectable "pivot" security. At the top of the table, two buttons appear: ABSOLUTE VALUES and RELATIVE VALUES. If the user desires to display the data as is, ABSOLUTE VALUES is selected and the imported data is shown as is. However, if the user desires to display the index numbers in accordance with the present invention, they select "RELATIVE VALUES"

Using one-year historical data, the program computes the following benchmark security factors for each selected stock.
Latest Price
% change in price vs 30 days
% change in price vs 90 days
% change in price vs 180 days
% change in price vs 365 days
% change in price from 52 week high
% change in price from 52 week low
Average Daily Volume 90 days
Market Capitalization (mrq)
Shares Outstanding (mrq)
Annual Dividend (ttm)
Dividend Yield (ttm)
Earnings Yield (ttm)
Per Share Book Value (ttm)
EPS (earnings per share)
Sales
EBITDA (earnings before income and taxes)
Price/Book Value (mrq)
Price/Earnings (ttm)
Price/Sales (ttm)
Return on Assets
Return on Equity
Current Ratio (mrq)
Debt/Equity (mrq)
Shares Short
Short Ratio Thus, as shown in FIG. 2(a-f) for example, if the user had selected AMGEN (AMGN) and Pharmacia (PHA), the following data would initially be displayed in Absolute terms:

| Latest Price | AMGEN | PHARMACIA |
| --- | --- | --- |
| % change in price vs 30 days | $60.25 | $55.125 |
| % change in price vs 90 days | 0 | 0 |
| % change in price vs 180 days | 0 | 0 |
| % change in price vs 365 days | 0 | 0 |
| % change in price from 52 week high | 0 | 0 |
| % change in price from 52 week low | 0 | 0 |
| Average Daily Volume 90 days | 0 | 0 |
| Market Capitalization (mrq) | 0 | 0 |

-continued

| Latest Price | AMGEN | PHARMACIA |
| --- | --- | --- |
| Shares Outstanding (mrq) | $55188.7 | $63953 |
| Annual Dividend (ttm) | 1073741824 | 1610612736 |
| Dividend Yield (ttm) | $0 | $0.48 |
| Earnings Yield (ttm) | $0 | $0.94 |
| Per Share Book Value (ttm) | $1.88 | $3.04 |
| EPS (earnings per share) | $2.97 | $10.46 |
| Sales | $1.01 | $1.55 |
| EBITDA (earnings bef. income/taxes) | $3408.7 | $9772 |
| Price/Book Value (mrq) | $0 | $0 |
| Price/Earnings (ttm) | 12.42 | 4.37 |
| Price/Sales (ttm) | 53.2 | 32.9 |
| Return on Assets | 16.19 | 2.71 |
| Return on Equity | 26.04 | 6.7 |
| Current Ratio (mrq) | 12.64 | 12.64 |
| Debt/Equity (mrq) | 1.45 | 1.45 |
| Shares Short | 0 | 0 |
| Short Ratio | 0 | 0 |
| | 0 | 0 |

However, by placing the cursor on either of the two selected stocks and right-clicking, the user is given the drop-down menu option of designating that stock as the index stock versus "pivot" stock. This way, as shown in FIG. 3(a-f) if the user selects AMGEN as the index stock and, additionally, presses the RELATIVE VALUES button at top, AMGEN becomes the index and all of its values become the relative benchmark for determining the index numbers of all other displayed stocks. Specifically, all of the values shown for the PHARMACIA stock are recalculated and the following data would be displayed in Relative terms:

| Latest Price | AMGEN | PHARMACIA |
| --- | --- | --- |
| % change in price vs 30 days | 1 | 0.9 |
| % change in price vs 90 days | 0 | 0 |
| % change in price vs 180 days | 0 | 0 |
| % change in price vs 365 days | 0 | 0 |
| % change in price from 52 week high | 0 | 0 |
| % change in price from 52 week low | 0 | 0 |
| Average Daily Volume 90 days | 0 | 0 |
| Market Capitalization (mrq) | $1 | 1.1 |
| Shares Outstanding (mrq) | 1 | −1.5 |
| Annual Dividend (ttm) | $0 | Infinity |
| Dividend Yield (ttm) | $0 | Infinity |
| Earnings Yield (ttm) | $1 | 1.6 |
| Per Share Book Value (ttm) | $1 | 3.5 |
| EPS (earnings per share) | $1 | 1.5 |
| Sales | $1 | 2.8 |
| EBITDA (earnings bef. income/taxes) | $0 | 0 |
| Price/Book Value (mrq) | 1 | 0.3 |
| Price/Earnings (ttm) | 1 | 0.6 |
| Price/Sales (ttm) | 1 | 0.1 |
| Return on Assets | 1 | 0.2 |
| Return on Equity | 1 | 0.3 |
| Current Ratio (mrq) | 1 | 0.4 |
| Debt/Equity (mrq) | 0 | 0 |
| Shares Short | 0 | 0 |
| Short Ratio | 0 | 0 |

The Relative output presents the security numbers in absolute values, or as ratios, relative to a single selectable "pivot" security. Note that independent mouse support must be provided within the C & I system applet, and this is accomplished by separate mouse control applets which are called if the mouse cursor enters the C & I applet's portion of the screen, or if the mouse button is pressed while the mouse cursor is over the C & I applet's portion of the screen. The mechanics of mouse control applets are well-known. It is also possible to display various graphs and charts comparing the security numbers (also absolute or as ratios of the pivot security).

Figure 4:
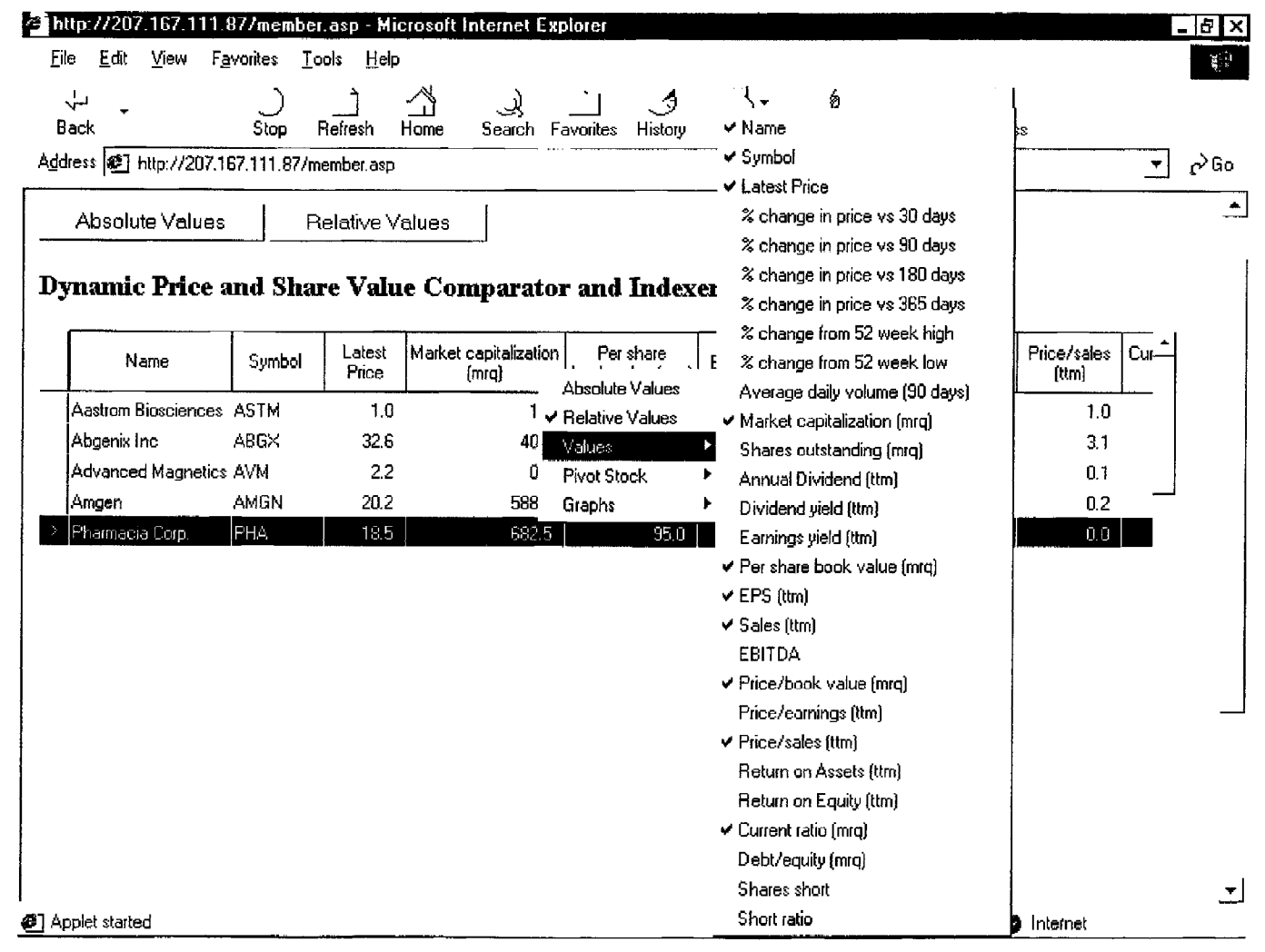

As shown in FIG. 4, the user can select the array of values to be considered in each of the screens shown in FIGS. 2-3 simply by right-clicking the mouse and making the appropriate selections. In the same way, the user can make a selection of the pivot company to can be represented as 100 for each of the factors when the table is viewed on a relative (indexed) basis. Any of the companies listed can be selected by the user as the pivot security. This way, relative valuations to those of the pivot security become immediately apparent either resulting in a value conclusion or determination as to the areas necessary for further focused study.

As is typical with spreadsheets, the user can also display various graphs and charts comparing the security numbers (also absolute or as ratios of the pivot security).

The foregoing security comparison system is capable of facilitating the comparison in indexed terms of a large number of user selected factors relating to a large number of user selected securities, all with regard to a single "pivot" security. This introduces the concept of opportunity cost to investment management, thereby resulting in better quality decision making, in less time, with the result of improved investment management performance. More importantly, this method allows the user to compare the selected securities based on personalized opportunity costs rather than subscription indices such as the Dow. Thus, the investment decision reflects the users individualized alternatives rather than market averages.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. For example, the system works equally well with stocks, debt instruments, options, and commodities futures. It is to be understood, therefore, that the invention may be practiced otherwise than as specifically set forth in the appended claims.

I claim:

1. An automated system for dynamic security price and value indexed comparison, comprising:
   a central web server running supporting software including a spreadsheet for maintaining current and historical security market data, and a security monitoring module for importing said security market data into the spreadsheet, said central web server being individually accessible by subscribers;
   a comparator & indexer applet also maintained on the central web server and accessible by said subscribers upon connection to said central web server to derive user-selectable security factors from the security market data in the central server to calculate the index number of said user-selectable security factors relative to a single pivot security, and to display said user-selectable security factors arranged in a table of rows of user-selectable securities and columns of said factors derived from said user-selectable security data, said display selectively including the absolute value of said security factors and/or the index number of said security factors;
   whereby said automated system permits a user to compare, in both absolute and indexed terms, a plurality of statistics relating to a plurality of user-selected securities;
   wherein said automated system allows said user to compare the designated securities based on personalized opportunity costs.

2. The automated system according to claim 1, wherein said comparator and indexer applet is a Java applet that allows each accessing subscriber to designate a subset of securities from said database, designate one or more financial statistics, designate a pivot security, calculate said financial statistics, and display said financial statistics to said accessing user dynamically and in real time.

3. The automated system according to claim 2, wherein said Java applet allows each accessing user to designate, calculate and display said one or more financial statistics in spreadsheet from by rows corresponding to each designated security and columns of each financial statistics as either absolute values, or as indexed values relative to said pivot security.

4. The automated system according to claim 3, wherein said one or more financial statistics include any subset from among the group comprising latest price, change in price vs 30 days, % change in price vs 90 days, % change in price vs 180 days, % change in price vs 365 days, % change in price from 52 week high, % change in price from 52 week low, average daily volume 90 days, market capitalization (mrq), shares outstanding (mrq), annual dividend (ttm), dividend yield (ttm), earnings yield (ttm), per share book value (ttm), eps (earnings per share), sales, ebitda (earnings bef. income/taxes), price/book value (mrq), price/earnings (ttm), price/sales (ttm), return on assets, return on equity, current ratio (mrq), debt/equity (mrq), shares short, and short ratio.

5. A method for dynamic security price and value indexed comparison, comprising the steps of:
   maintaining current and historical security market data in the database for a plurality of securities;
   providing individuals access to said database for subscribers;
   allowing each accessing subscriber to designate a subset of securities from said database;
   allowing each accessing subscriber to designate one or more security factors to be calculated based on said historical security market data, and displayed for each designated security;
   allowing each accessing subscriber to designate one of said securities from said subset to be a pivot security;
   calculating said security factors from said historical security market figures, and for each security factor calculating an indexed number relative to corresponding security factors for said pivot security;
   displaying said security factors to said accessing user in both absolute terms and as said indexed number relative to the pivot security;
   whereby said method permits accessing user to compare, in both absolute and indexed terms, a plurality of statistics relating to a plurality of user-selected securities
   wherein said method allows said accessing user to compare the designated securities based on personalized opportunity costs.

6. The method according to claim 5, wherein said steps of allowing each accessing subscriber to designate a subset of securities from said database, allowing each accessing subscriber to designate one or more financial statistics, allowing each accessing subscriber to designate a pivot security, calculating said financial statistics, and display said financial statistics to said accessing user are collectively implemented in software as a first Java applet that dynamically accomplishes all of said steps in real time.

7. The method according to claim 6, wherein said first Java applet allows each accessing user to designate, calculate and display said one or more financial statistics as a spreadsheet by rows corresponding to each designated security and columns of each financial statistics as either absolute values, or as indexed values relative to said pivot security.

8. The method according to claim 7, wherein said one or more financial statistics include any subset from among the group comprising latest price, change in price vs 30 days, % change in price vs 90 days, % change in price vs 180 days, % change in price vs 365 days, % change in price from 52 week high, % change in price from 52 week low, average daily volume 90 days, market capitalization (mrq), shares outstanding (mrq), annual dividend (ttm), dividend yield (ttm), earnings yield (ttm), per share book value (ttm), eps (earnings per share), sales, ebitda (earnings bef. income/taxes), price/book value (mrq), price/earnings (ttm), price/sales (ttm), return on assets, return on equity, current ratio (mrq), debt/equity (mrq), shares short, and short ratio.

9. The method according to claim 7, wherein each step of maintaining current and historical security market figures in a database for a plurality of securities is implemented as a second Java applet, and said first and second Java applets cooperate to maintain said spreadsheet display updated in real time.

* * * * *